Patented Nov. 18, 1941

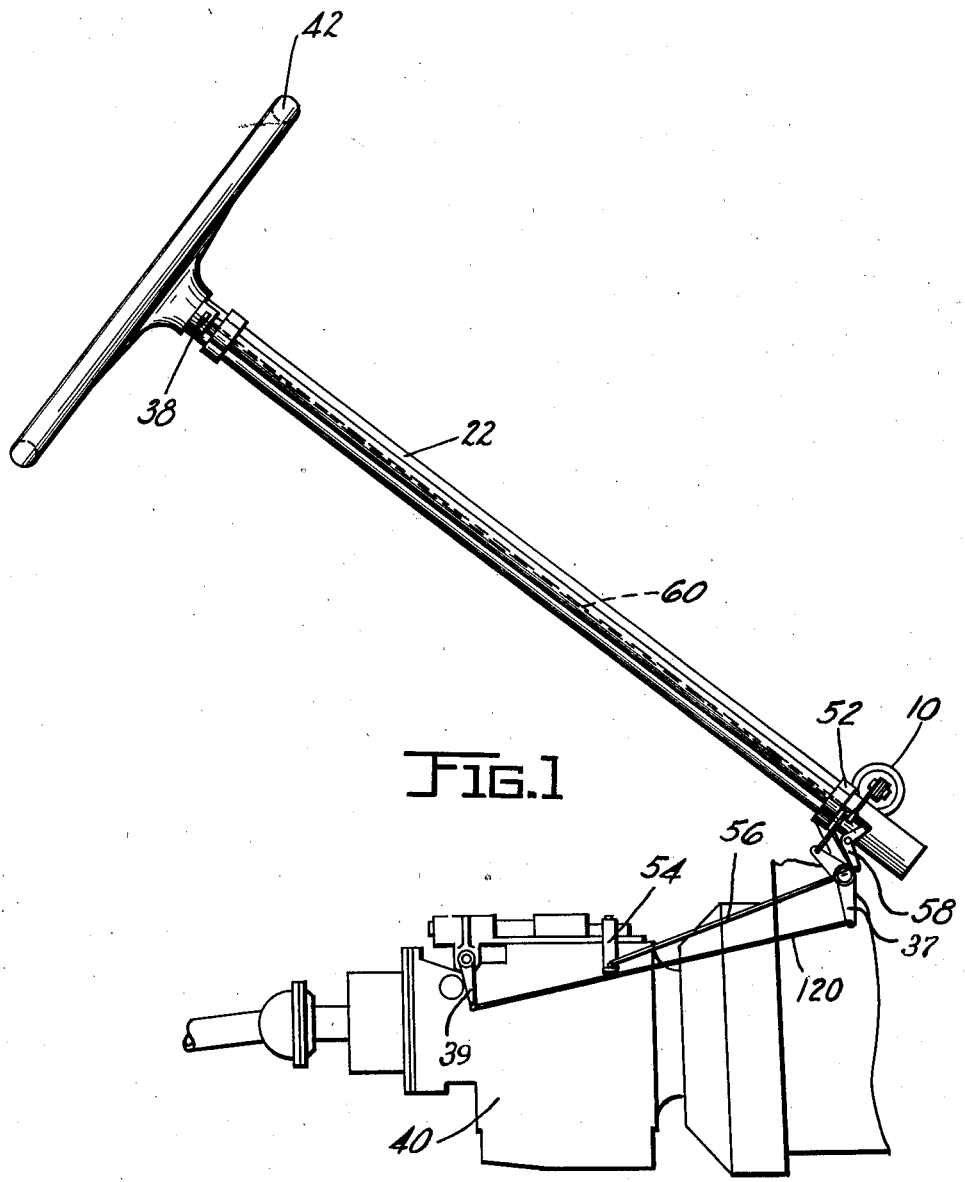

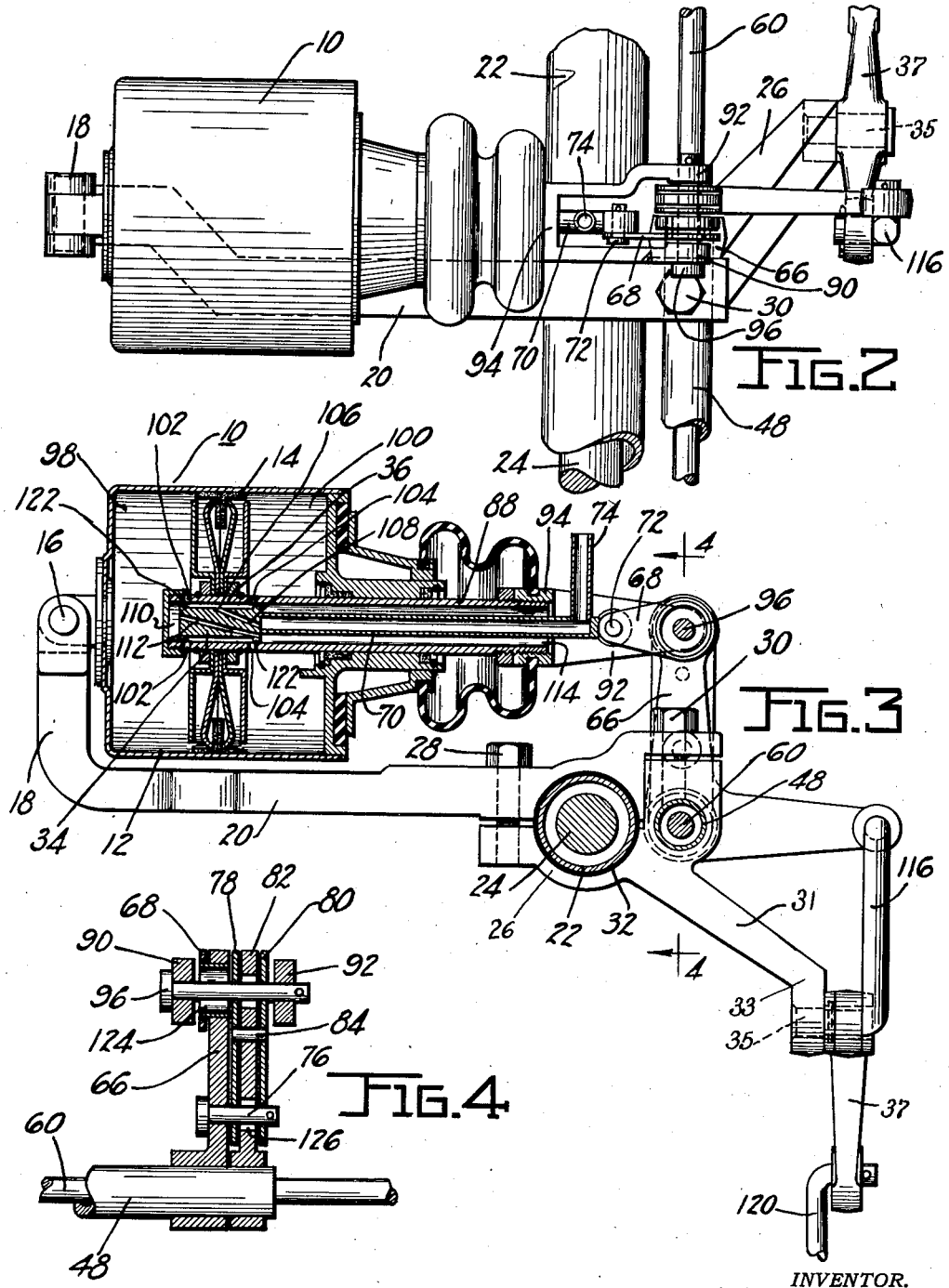

2,262,857

UNITED STATES PATENT OFFICE 2,262,857

TRANSMISSION CONTROL

Harold W. Price, South Bend, Ind., assignor to Bendix Products Corporation, South Bend, Ind., a corporation of Indiana Application August 26, 1938, Serial No. 226,975

1 Claim. (Cl. 248—14)

This invention relates to motor vehicles and more particularly to means for operating the transmissions thereof.

Motor vehicles in general have a selective type of so-called step type of transmission, and the usual way of operating the different gear sets is by means of a manually movable shift lever protruding from the floorboard of the driver's compartment and conveniently located near the hand of the driver. Such a lever, however, is to a degree an obstacle in the compartment, and it is obvious that a removal of the same increases the leg room of the driver and the persons beside him.

It is accordingly an object of the invention to provide means for operating the transmission which does not include the conventional gear shift lever. The preferred embodiment of my invention includes a pressure differential operated motor operatively connected to the shift rails of the transmission, the motor being controlled by a valve mechanism operated by a selector mounted immediately beneath the steering wheel.

The principal object of my invention, however, is to provide a transmission operating power means, the motor unit thereof being mounted on the steering column of the vehicle, and accordingly easily installed, readily accessible for adjusting, overhauling, etc.

Yet another object of the invention is to include in a transmission operating power means a motor unit, said unit comprising a motor, a control valve therefor and valve and motor operating linkage, all compacted, the parts thereof being so constructed and arranged as to be easily mounted on the steering column of the vehicle beneath the floorboard of the driver's compartment.

Another object of the invention is to provide a simple and compact combined power and manually operated means for operating a three-speeds forward and reverse automotive transmission, the mechanism being such that the operation of the control means therefor simulates the operation of a conventional shift lever. By that it is meant that the manner of operation of the control means and the resistance to the movement of the control means simulate the operation of a conventional shift lever.

Other objects of the invention and desirable details of construction and combinations of parts will become apparent from the following description of a preferred embodiment, which description is taken in conjunction with the accompanying drawings, in which:

Figure 1 is a diagrammatic view disclosing the principal elements of the transmission operating means constituting my invention;

Figure 2 is a plan view disclosing the motor unit of my invention mounted in place on the steering column;

Figure 3 is a side elevational view, partly in section, of the motor unit disclosed in Figure 2; and Figure 4 is a sectional view, taken on the line 4—4 of Figure 3, of the principal elements of the so-called reactionary valve and transmission operating linkage.

In that embodiment of my invention disclosed in the drawings, a vacuum suspended double-ended pressure differential operated motor 10, comprising a cylinder 12 and a piston 14, is pivotally mounted at 16 upon the upwardly extending arm 18 of a two-part bracket or mounting comprising members 20 and 26. As clearly disclosed in Figure 3, the inner surface of one end of the member 20 is recessed to fit about the steering column 22 of the vehicle, the column housing a steering post 24. The member 26 of the bracket is also recessed at one of its ends to fit the column, the two members of the bracket being clamped together about the column by fastenings 28 and 30 and extending crosswise of the steering column. In this mounting, a rubber bushing 32 may be inserted between the column 22 and the bracket members 20 and 26 to avoid the transmission of sound from the motor unit through the steering column and up through the steering wheel. As disclosed in Figure 3 the member 26 is provided with an arm 31 which extends downwardly and at an angle to the plane of the bracket 20, 26. At its end this arm is bent at 33 to provide a support for a pin 35 and said pin serves as a pivot for a bell crank lever 37 constituting a part of the force transmitting linkage interconnecting the piston 14 with the change-speed transmission 40 of the vehicle. As disclosed in Figure 3 the member 26 is also provided with a circular shaped opening to receive a part of the force transmitting means interconnecting a transmission controlling selector 38 and a part of the linkage for operating the control valve of the motor 10.

Describing briefly the remainder of the principal elements of my transmission operating mechanism, a valve mechanism within the motor, including relatively movable members 34 and 36, controls the operation of the motor, and linkage mechanism, the principal elements of which are disclosed in Figures 3 and 4, serves to interconnect the valve and transmission operating selector 38, the piston or power element 14 of the motor, the aforementioned valve mechanism and a crank 39 for operating the shift rails of a three-speed forward and reverse transmission 40.

The most important feature of my invention lies in the compactness of the above-described transmission operating power means, for, as disclosed in Figure 3, the motor 10, the control valve housed therein, the valve operating linkage disclosed in this figure and the bracket 26 together constitute a portable unit which may be clamped upon the steering post either of new or of used vehicles. This unit may also be employed as part of power means for operating other controls of the vehicle, such, for example, as those constituting a part of or associated with the internal-combustion engine.

The operation of placing the transmission in low gear will now be described, such description incidentally bringing out the details of the mechanism constituting my invention. The selector 38 is first moved upwardly in a plane perpendicular to the plane of the steering wheel 42. The selector 38 is connected to a crank 54 by means of a link 56, a crank 58 and a rod 60. When the selector is angularly moved upwardly, the crank 54 is actuated, thereby operating the transmission to select the low and reverse gear shift rail thereof. No claim is made to the transmission: accordingly, the same is not disclosed in detail. However, suffice it to say, as is true of most of the selective types of step transmissions of the day, the transmission is established in gear by the movement of shift rails to which the gears are connected. The cranks 54 and 39 serve to operate mechanism for first selecting the rail to be operated and then moving the selected rail to establish the transmission in gear.

Continuing the description of the operation of placing the transmission in low gear, after the selector 38 has been operated, as just described, to select the low and reverse shift rail, it is then rotated clockwise in a plane parallel to the steering wheel. This movement serves to open the valve by moving the valve member 34 to the right and simultaneously moving the valve member 36 to the left. The member 34 is connected to the tube 48 by a crank 66, a link 68 pivotally connected to the end of the crank and a tube 70 pivotally connected at 72 to the link 68. The member 34 is fixedly secured to one end of the tube 70, the latter being connected by a nipple 74 to the intake manifold of the car or other source of vacuum. Referring to Figure 4, disclosing the most important elements of the valve and transmission operating linkage, when the selector 38 is rotated clockwise, the crank 66 rotates clockwise. Such action serves, through the intermediary of a pin 76, to impart a counter-clockwise movement to two so-called reaction links 78 and 80, the latter straddling a transmission operating bell crank lever member 82 and being pivoted thereto by a pin 84. When the reaction links are rotated about the pin 84, the valve member 36, which constitutes the hub of the piston 14, is, as above described, moved to the left, the connection between member 36 and the reaction links including a connecting rod 88, furcations 90 and 92 of a member 94 adjustably secured to the outer end of the rod and a pin 96. Accordingly, it is apparent that upon rotating the selector 38 clockwise the valve mechanism is opened or, as defined in this art, cracked by simultaneously moving the valve members 34 and 36 in different directions. Moving both parts of the valve mechanism at the same time insures a quick opening of the valve.

When the piston 14 is in its neutral position, as disclosed in Figure 3, the transmission is in neutral, and in this position both compartments 98 and 100 of the motor are connected to the intake manifold via ports 102 and 104 in valve member 36, a recess 106 and a port 108 in valve member 34, the tube 70 and a nipple 74. When the engine is idling, the moving pistons thereof acting as pump members serve to partially evacuate the intake manifold. Accordingly, when the engine is idling and the piston 14 is in its central position, both compartments 98 and 100 of the motor are partially evacuated.

Now, when the selector is moved toward its low gear position, as previously described, and the valve members 34 and 36 are moved to the right and left respectively, it will be apparent that the compartment 100 remains in communication with the manifold, and the compartment 98 is placed in communication with the interior of the hollow rod via port 102, a compartment 110 and a duct 112 in valve member 34. This rod is vented to the atmosphere at 114; therefore, with the cracking of the valve, the compartment 98 is vented to the atmosphere. The piston 14 is accordingly subjected to a differential of pressures, resulting in its movement to the right to rotate the reaction levers 78 and 80 about the pin 76 as a fulcrum and, by means of the pin 84, to rotate the bell crank lever 82. As clearly disclosed in Figures 2 and 3, the latter lever is connected to the shift rail operating crank 39 by means of a link 116, the bell crank lever 37 and a link 120. The movement of the crank 39 effects a movement of the low and reverse shift rail toward its position to establish the transmission in low gear. In this operation, the valve operating link 68, by virtue of the load on the pin 76 when the same is acting as a fulcrum, is subjected to a force tending to rotate the same counterclockwise, that is, in a direction opposite to that necessary to crack the valve to place the transmission in low gear. In other words, the selector is subjected to a force producing what is known in the art as "feel." It should also be noted that the valve member 34 is at the time held stationary, inasmuch as the selector is being held stationary. Accordingly, with the movement of the valve member 36 to the right, land portion 122 of the valve member 34 registers with the ports 102 to cut off the inflow of air into the compartment 98 and to lap the valve. The entire system is then in equilibrium.

Reviewing this operation, when the selector 38 is moved toward its low gear position, it is subjected to a load which resists further movement of the selector; for, when the movement of the selector is stopped, the valve member 36 continues to move until the valve is lapped and the system is in equilibrium. When the selector is moved only part way toward its low gear position, it will, of course, be necessary to complete its movement to establish the transmission in low gear. Accordingly, when the selector is again moved clockwise, there is a repetition of the above-described cycle of operations, and inasmuch as an additional quantity of air is admitted to the compartment 98, it follows that the fulcrum pin 76 is subjected to a greater load, resulting in a greater reactionary load upon the selector 38. The resistance to movement of the selector is accordingly directly proportional to the degree of movement toward its low gear position.

Should the motor fail for any reason, all lost motion in the above-described linkage, for example, the slots 124 and 126, Figure 4, permitting the cracking and lapping of the valve, is taken up and the connection goes solid to make possible a manual operation of the transmission with movement of the selector.

The operation of establishing the transmission in low gear having been described in detail, it is believed unnecessary to describe in detail the operation of reversing a direction of movement of the piston or power element 14 of the motor to place the transmission in neutral, nor is it believed necessary to describe the operation of the mechanism, after the cross-shift operation of the transmission, to again energize the motor to complete the movement of the piston to place the transmission in second gear. Suffice it to say that with counterclockwise movement of the selector 38 the valve mechanism is again opened by moving the valve members 34 and 36 to the left and right respectively. It follows therefore, from the description previously given, that the compartment 98 will be evacuated and the compartment 100 vented to the atmosphere, resulting in the movement of the piston to the left either to neutralize the transmission or to place the same either in reverse or in second gear, depending, of course, upon the operation of the shift rail selector mechanism. As with the previously described operation, there is in this operation a load upon the selector to effect the desired feel and the follow-up to-lap operation of the valve mechanism.

There is thus provided, with the above-described mechanism, power means for operating the change-speed transmission of an automotive vehicle, the major portion of the mechanism, including the motor, control valve and operating linkage, being mounted as one compact unit upon the steering column of the vehicle. The control of the power means is effected by a miniature lever or selector mounted within easy reach of the driver, and the operation of the selector closely simulates the operation of the gear shift lever of the standard transmission of the day.

While one illustrative embodiment has been described, it is not my intention to limit the scope of the invention to that particular embodiment, or otherwise than by the terms of the appended claim.

I claim:

In an automotive vehicle of the type provided with a change-speed transmission, a steering post and power means for operating the transmission, the combination therewith of a mounting for the power means and a part of the force transmitting means associated with said power means, said mounting including a two part bracket fixedly secured to the steering post and extending crosswise thereof, each of the parts of said bracket being recessed to fit about said post, one of said parts including an arm for supporting the power means and the other of said parts having an opening therein to receive a portion of said force transmitting means and including an arm for supporting at its end another portion of said force transmitting means.

HAROLD W. PRICE.